(12) United States Patent
Hwang

(10) Patent No.: US 10,511,011 B2
(45) Date of Patent: Dec. 17, 2019

(54) ELECTROLYTE IMPREGNATION APPARATUS

(71) Applicant: LG CHEM, LTD., Seoul (KR)

(72) Inventor: Gyu Ok Hwang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 74 days.

(21) Appl. No.: 15/743,814

(22) PCT Filed: Mar. 22, 2017

(86) PCT No.: PCT/KR2017/003086
§ 371 (c)(1),
(2) Date: Jan. 11, 2018

(87) PCT Pub. No.: WO2017/179831
PCT Pub. Date: Oct. 19, 2017

(65) Prior Publication Data
US 2018/0198111 A1    Jul. 12, 2018

(30) Foreign Application Priority Data

Apr. 15, 2016  (KR) .......................... 10-2016-0046250

(51) Int. Cl.
*H01M 2/36* (2006.01)
*H01M 10/04* (2006.01)
*H01M 10/42* (2006.01)

(52) U.S. Cl.
CPC ....... *H01M 2/361* (2013.01); *H01M 10/0404* (2013.01); *H01M 10/4214* (2013.01)

(58) Field of Classification Search
None
See application file for complete search history.

(56) References Cited

U.S. PATENT DOCUMENTS

| 3,734,805 A | * | 5/1973 | Obeda | B29C 65/086 |
| | | | | 156/580.1 |
| 6,465,121 B1 | * | 10/2002 | Dawson | H01M 2/38 |
| | | | | 429/51 |
| 8,728,650 B2 | | 5/2014 | Kim et al. | |
| 2013/0065111 A1 | * | 3/2013 | Kim | H01M 2/38 |
| | | | | 429/163 |
| 2013/0312869 A1 | | 11/2013 | Klien et al. | |

(Continued)

FOREIGN PATENT DOCUMENTS

| GB | 1 385 910 A | 3/1975 |
| JP | S63-224158 A | 3/1975 |

(Continued)

OTHER PUBLICATIONS

Machine Translation for KR 10-2015-0095387. (Year: 2015).*

(Continued)

*Primary Examiner* — Eli S Mekhlin
(74) *Attorney, Agent, or Firm* — Mintz Levin Cohn Ferris Glovsky and Popeo, P.C.; Jhongwoo Peck

(57) ABSTRACT

The present invention relates to an electrolyte impregnation apparatus comprising: a pressing unit comprising a pressing plate that presses a battery cell in which an electrode assembly and an electrolyte are accommodated; and an ultrasonic vibration unit installed to a portion or the whole of the pressing plate to apply ultrasonic vibration to the battery cell.

15 Claims, 11 Drawing Sheets

(56) References Cited

U.S. PATENT DOCUMENTS

| | | | |
|---|---|---|---|
| 2014/0087245 A1* | 3/2014 | Lee | H01M 2/0212 |
| | | | 429/179 |
| 2015/0147598 A1 | 5/2015 | Inoue et al. | |
| 2015/0244016 A1 | 8/2015 | Chung et al. | |

FOREIGN PATENT DOCUMENTS

| | | | |
|---|---|---|---|
| JP | 2012533166 A | 12/2012 | |
| JP | 2014502410 A | 1/2014 | |
| JP | 2015032503 A | 2/2015 | |
| KR | 10-1999-0055239 A | 7/1999 | |
| KR | 10-2000-0025359 A | 6/2000 | |
| KR | 10-0958649 B1 | 5/2010 | |
| KR | 10-2014-0018014 A | 2/2014 | |
| KR | 10-2014-0087635 A | 7/2014 | |
| KR | 10-2015-0016348 A | 2/2015 | |
| KR | 10-2015-0095387 A | 8/2015 | |

OTHER PUBLICATIONS

European Search Report for Appl. No. 17782586.6 dated Jun. 5, 2018.
Office Action corresponding to Japanese Patent Application No. 2018-514339, dated Mar. 25, 2019, 6 pages.

* cited by examiner

ELECTROLYTE IMPREGNATION APPARATUS

CROSS-REFERENCE TO RELATED APPLICATION

The present application claims the benefit of the priority of Korean Patent Application No. 10-2016-0046250, filed on Apr. 15, 2016, which is hereby incorporated by reference in its entirety.

TECHNICAL FIELD

The present invention relates to an electrolyte impregnation apparatus, and more particularly, to an electrolyte impregnation apparatus in which ultrasonic vibration is applied to a battery cell to improve impregnation ability of an electrolyte.

BACKGROUND ART

In general, secondary batteries refer to chargeable and dischargeable, unlike primary batteries that are not chargeable. The secondary batteries are being widely used in the high-tech electronic fields such as mobile phones, notebook computers, and camcorders.

Such a secondary battery is provided with one or more battery cells. Each of the battery cells comprises an electrode assembly and a case in which an electrolyte is accommodated together with the electrode assembly.

That is, the battery cell is manufactured by injecting the electrolyte into the case in which the electrode assembly is accommodated after the electrode assembly is accommodated into the case. Here, the electrolyte is impregnated into the electrode assembly while being absorbed into the electrode assembly.

However, the battery cell has a problem in which the electrolyte injected into the case is not absorbed up to the inside of the electrode assembly.

DISCLOSURE OF THE INVENTION

Technical Problem

The present invention has been made to solve the above problem, and an object of the present invention is to provide an electrolyte impregnation apparatus in which ultrasonic vibration is applied to a battery cell to induce an electrolyte injected into the battery cell so that the electrolyte is absorbed up to the inside of the electrode assembly and thereby to improve impregnation ability of the electrolyte.

Technical Solution

To achieve the above object, an electrolyte impregnation apparatus according to the present invention comprises: a pressing unit comprising a pressing plate that presses a battery cell in which an electrode assembly and an electrolyte are accommodated; and an ultrasonic vibration unit installed to a portion or the whole of the pressing plate to apply ultrasonic vibration to the battery cell.

The ultrasonic vibration unit may comprise an ultrasonic vibration element applying the ultrasonic vibration to the battery cell and an ultrasonic generator applying a voltage to the ultrasonic vibration element to vibrate the ultrasonic vibration element.

The ultrasonic vibration element may be disposed on a pressing surface of the pressing plate that presses the battery cell.

A plurality of ultrasonic vibration elements may be regularly or irregularly arranged on the pressing surface of the pressing plate.

The ultrasonic generator may apply the voltage to one or two or more ultrasonic vibration elements of the plurality of ultrasonic vibration elements disposed on the pressing plate to vibrate the ultrasonic vibration elements to which the voltage is applied.

The ultrasonic vibration unit may comprise a fixing member for fixing the ultrasonic vibration element to the pressing surface of the pressing plate.

The fixing member may be provided as a spring.

A protection cover having flexibility may be disposed on an outer circumferential surface of the spring.

A first vibration group constituted by a plurality of ultrasonic vibration elements, each of which has a first size, and a second ultrasonic vibration group constituted by a plurality of ultrasonic vibration elements, each of which has a second size equal to or different from the first size, may be disposed on the pressing surface of the pressing plate.

The first vibration group may be disposed on one side of the pressing surface of the pressing plate, and the second vibration group may be disposed on the other side of the pressing surface of the pressing plate.

The number of ultrasonic vibration elements provided in the second vibration group may be greater than that of ultrasonic vibration elements provided in the first vibration group.

The ultrasonic vibration elements of the second vibration group may be more densely arranged than those of the first vibration group.

The ultrasonic generator may apply a voltage to the plurality of ultrasonic vibration elements provided in the first vibration group to vibrate the plurality of ultrasonic vibration elements or apply a voltage to the plurality of ultrasonic vibration elements provided in the second vibration group to vibrate the plurality of ultrasonic vibration elements.

The ultrasonic generator may apply a voltage to only a portion of the plurality of ultrasonic vibration elements provided in the first vibration group.

The ultrasonic generator may apply a voltage to only a portion of the plurality of ultrasonic vibration elements provided in the second vibration group.

The ultrasonic generator may apply a voltage to only a portion of the plurality of ultrasonic vibration elements provided in the first vibration group and simultaneously apply a voltage to only a portion of the plurality of ultrasonic vibration elements provided in the second vibration group.

The ultrasonic vibration element may be provided as a spring having elastic restoring force.

Advantageous Effects

The electrolyte impregnation apparatus of the present invention has effects as follows.

First: the electrolyte impregnation apparatus may apply the ultrasonic vibration to the battery cell to induce the electrolyte injected into the battery cell so that the electrolyte is absorbed up to the inside of the electrode assembly, thereby improving the impregnation ability of the electrolyte.

Second: the electrolyte impregnation apparatus may comprise the ultrasonic vibration element and the ultrasonic generator and thus be simplified in structure. Also, the ultrasonic vibration element may be vibrated by the voltage applied from the ultrasonic generator to improve the impregnation ability of the electrolyte.

Third: in the electrolyte impregnation apparatus, the ultrasonic vibration element may be disposed on the pressing surface of the pressing plate for pressing the battery cell to stably apply the ultrasonic vibration to the surface of the battery cell.

Fourth: in the electrolyte impregnation apparatus, the plurality of ultrasonic vibration elements may be regularly or irregularly arranged and thus be stably used in the battery cell having the various sizes and shapes.

Fifth: in the electrolyte impregnation apparatus, the ultrasonic generator may vibrate one or two or more ultrasonic vibration elements of the plurality of ultrasonic vibration elements, i.e., selectively vibrate the plurality of ultrasonic vibration elements. Thus, only the ultrasonic vibration element that presses the battery cell may be vibrated to improve the efficiency and reduce the energy consumption.

Sixth: in the electrolyte impregnation apparatus, the ultrasonic vibration element may be fixed to the pressing plate by the fixing member that is provided as the spring and thus be elastically supported to be prevented from being damaged. Particularly, the damage of the battery cell by the ultrasonic vibration element may be prevented.

Seventh: in the electrolyte impregnation apparatus, the first vibration group constituted by the ultrasonic vibration elements having the first size and the second vibration group constituted by the ultrasonic vibration elements having the second size may be provided and thus be selectively used according to the size of the battery cell.

Eighth: in the electrolyte impregnation apparatus, the ultrasonic vibration elements of the first vibration group and the ultrasonic vibration elements of the second vibration group may vary in size, arrangement, vibration intensity, or only a portion of the ultrasonic vibration elements may be vibrated to maximize the utilization of the electrolyte impregnation apparatus.

MODE FOR CARRYING OUT THE INVENTION

Figure 1:
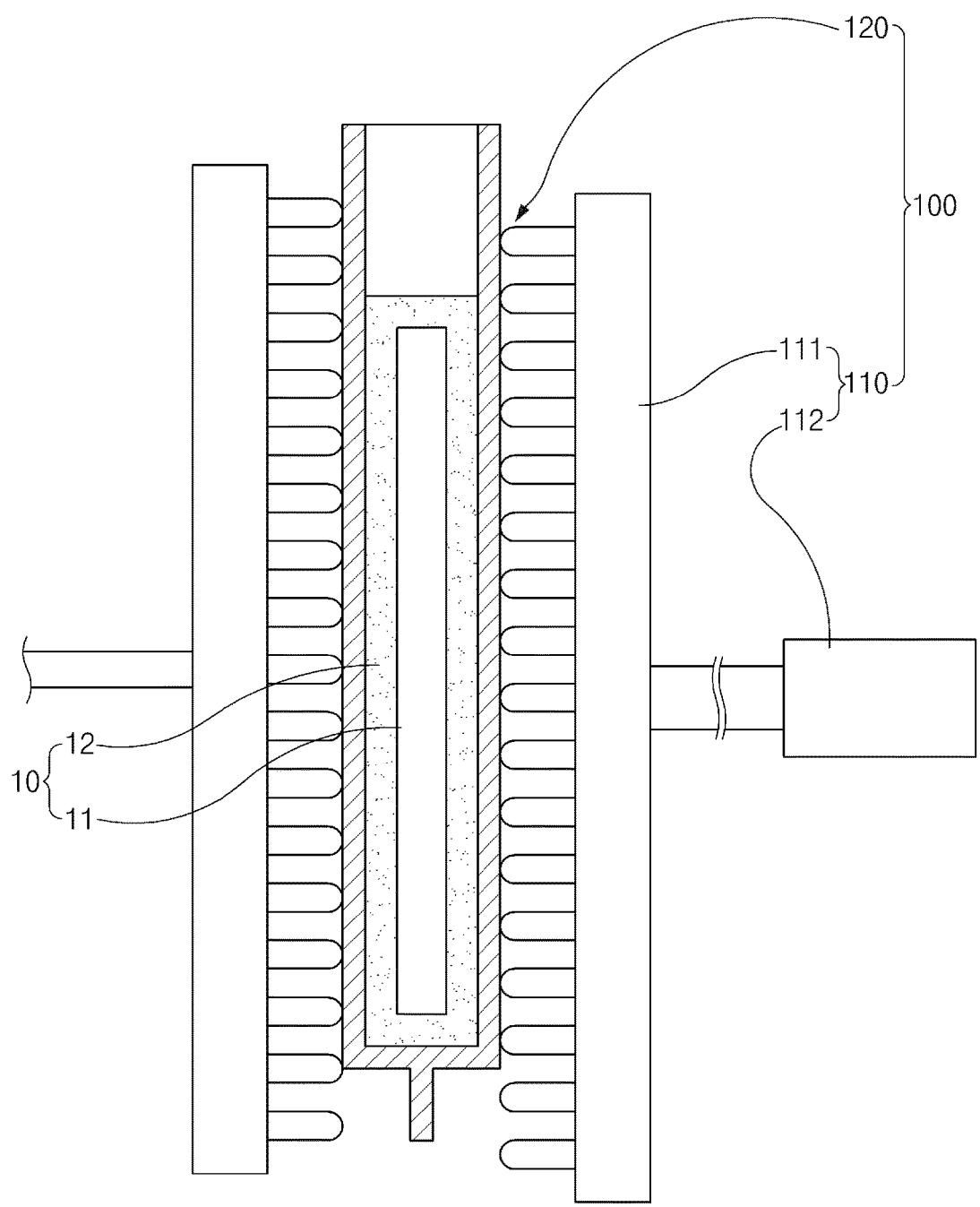
FIG. 1 is a view of an electrolyte impregnation apparatus according to the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrolyte Injection System]

An electrolyte injection system according to the present invention comprises an electrolyte injection apparatus (not shown) that injects an electrolyte through an opening of a battery in which an electrode assembly and the electrolyte are accommodated and an electrolyte impregnation apparatus 100 that presses the battery cell, into which the electrolyte is injected, to impregnate the electrolyte, which is injected into the battery cell, into the electrode assembly.

Although the electrolyte impregnation apparatus 100 presses the battery cell to impregnate the electrolyte into the electrode assembly, there are problems in which the electrolyte is not impregnated up to the inside of the electrode assembly, and particularly, much time for the electrolyte impregnation is spent.

To solve the above problems, the electrolyte impregnation apparatus according to the present invention may press the battery cell and simultaneously apply ultrasonic vibration to the battery cell. Thus, the electrolyte impregnation apparatus may induce the electrolyte so that the electrolyte is forcibly absorbed into the electrode assembly to improve impregnation ability, and particularly, reduce an electrolyte impregnation time.

The electrolyte impregnation apparatus according to the present invention will be described in detail with reference to the accompanying drawings.

[Electrolyte Impregnation Apparatus]

Figure 2:
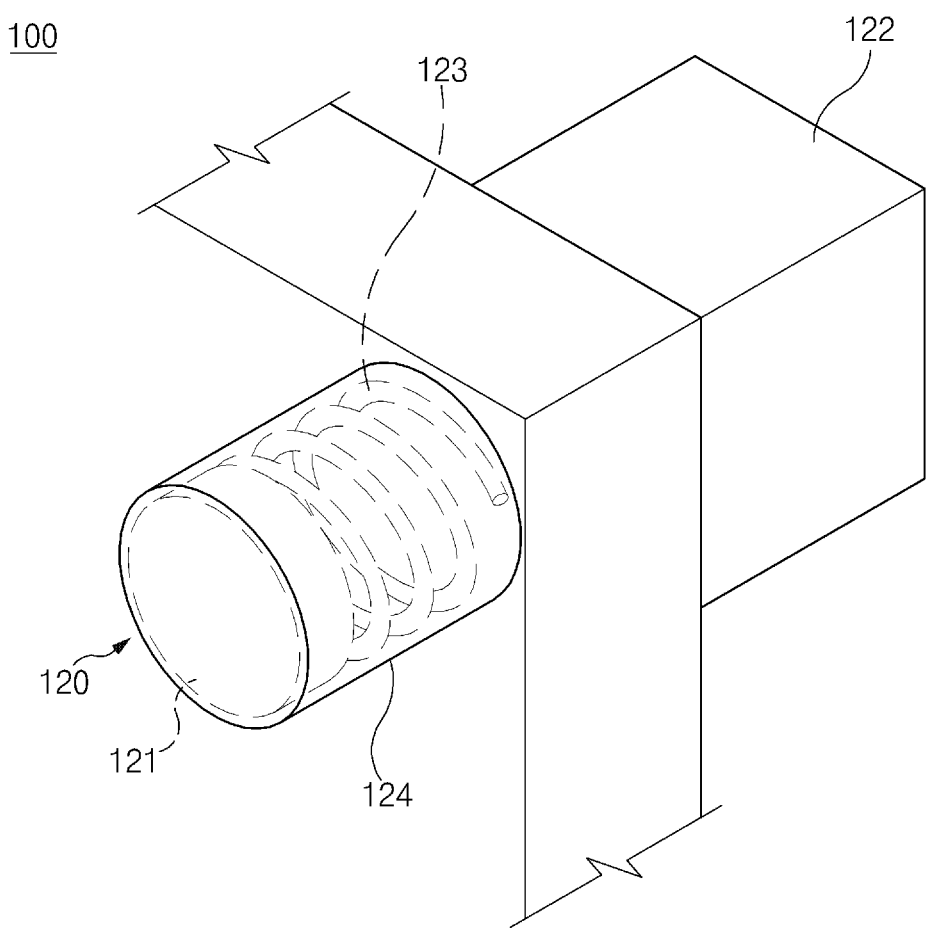
FIG. 2 is a perspective view illustrating an ultrasonic vibration unit of the electrolyte impregnation apparatus according to the present invention.

As illustrated in FIGS. 1 and 2, the electrolyte impregnation apparatus 100 according to the present invention comprises a pressing unit 110 pressing a battery cell 10 in which an electrode assembly 11 and an electrolyte are accommodated and an ultrasonic vibration unit 120 applying ultrasonic vibration to the battery call 10 that is pressed by the pressing unit 110.

Pressing Unit

Referring to FIG. 1, the pressing unit 110 comprises a pressing plate 111 pressing each of both surfaces of the battery cell 10 and a cylinder 112 moving the pressing plate 111 so that the pressing plate 111 presses each of both the surfaces of the battery cell 10. A pressing surface of the pressing plate 111 may have a flat plate shape so that the pressing plate 111 presses the surfaces of the battery cell by using the same force.

Ultrasonic Vibration Unit

Figure 3:
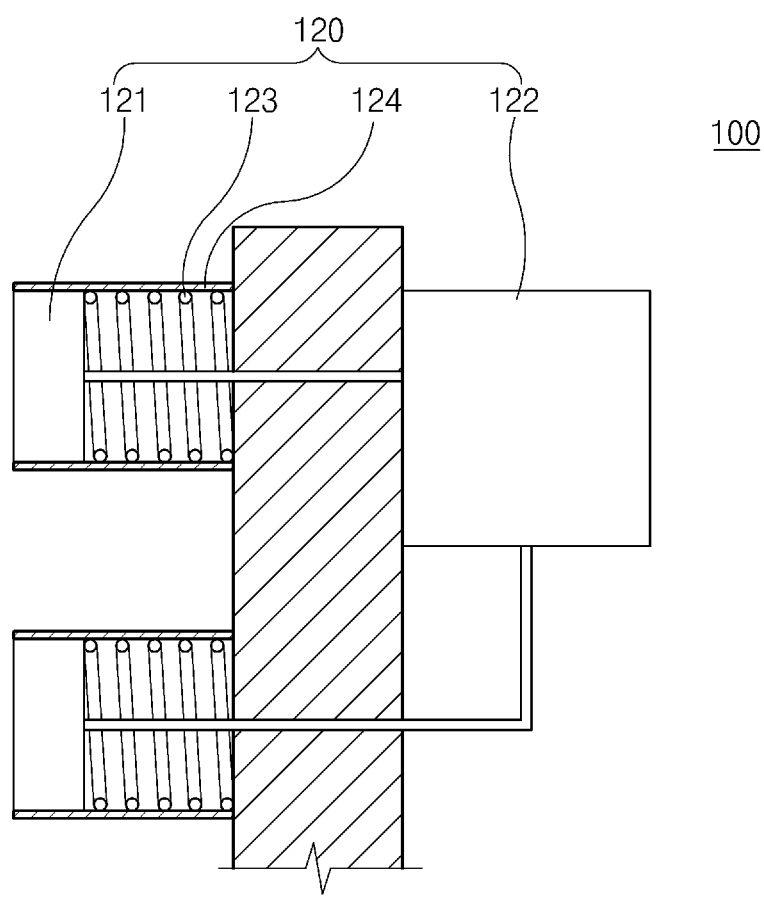
FIG. 3 is a cross-sectional view of FIG. 2.

As illustrated in FIGS. 2 and 3, the ultrasonic vibration unit 120 comprises an ultrasonic vibration element 121 installed on the pressing plate 111 to apply the ultrasonic vibration to the battery cell 10 and an ultrasonic generator 133 applying a voltage to the ultrasonic vibration element 121 to vibrate the ultrasonic vibration element 121.

Figure 4:
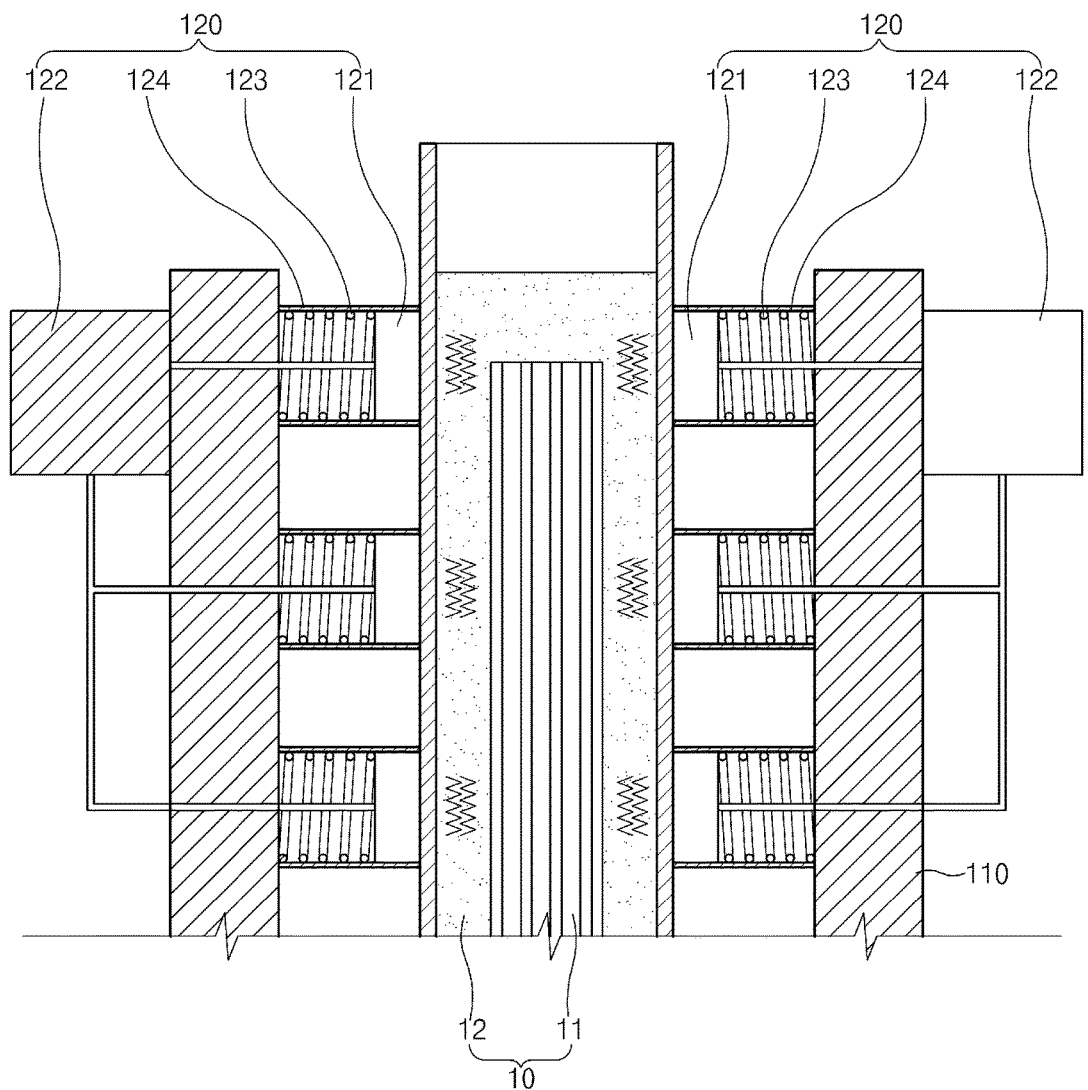
FIG. 4 is a view illustrating a use state of the electrolyte impregnation apparatus according to the present invention.
Figure 5:
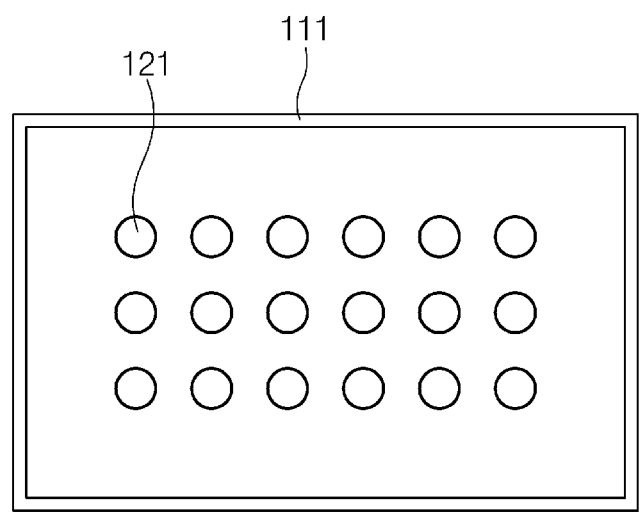
FIGS. 5 to 11 are views illustrating an arrangement of ultrasonic vibration elements of the electrolyte impregnation apparatus according to the present invention.

That is, as illustrated in FIG. 4, in the ultrasonic vibration unit 120, the ultrasonic vibration element 121 together with the pressing plate 111 may press the surface of the battery cell 10. Here, when the voltage is supplied to the ultrasonic generator 122, the ultrasonic vibration element 121 may be vibrated to forcibly vibrate electrolyte injected into the battery cell 10. Thus, the electrolyte 12 may be permeated and absorbed up to the inside of the electrode assembly 11 by the vibration force to improve the impregnation ability.

Here, the ultrasonic generator 122 may apply the voltage to one or two or more ultrasonic vibration elements of the plurality of ultrasonic vibration elements 121 to vibrate the ultrasonic vibration elements 121. That is, the plurality of ultrasonic vibration elements 121 may be selectively vibrated to improve efficiency. For example, the ultrasonic generator 122 may apply the voltage to only the ultrasonic vibration element 121 that presses the battery cell 10 to vibrate the ultrasonic vibration element 121. Thus, unnecessary energy may be prevented from being consumed.

Also, the ultrasonic vibration unit 120 further comprises a fixing member 123 fixing the ultrasonic vibration element 121 to the pressing plate 111. The fixing member 123 may stably fix the ultrasonic vibration element 121 to the pressing surface of the pressing plate 111. Particularly, the fixing member 123 may be provided as a spring. That is, the fixing member 123 that is the spring may provide elasticity to the ultrasonic vibration element 121 to allow the ultrasonic vibration element 121 to elastically press the surface of the battery cell 10 and prevent the battery cell 10 from being damaged by the ultrasonic vibration element 121.

Also, a protection cover 124 having flexibility may be disposed on an outer circumferential surface of the fixing member 123. The protection cover 124 protects the fixing member 123 from the outside without restricting the compression force of the fixing member 123.

The ultrasonic vibration unit 120 may press the battery cell 10 and simultaneously vibrate the battery cell 10 to allow the electrolyte injected into the battery cell 10 to be stably absorbed up to the inside of the electrode assembly 11, thereby improving the impregnation ability.

Hereinafter, in description of another embodiment of the present invention, constituents having the same configuration and function have been given with the same reference numeral in the drawings, and thus their duplicated descriptions will be omitted.

FIGS. 5 to 11 are views illustrating an arrangement structure of ultrasonic vibration elements according to the present invention.

According to a first embodiment, in the ultrasonic vibration unit, an ultrasonic vibration element 121 may be installed on a portion or the whole of a pressing surface of a pressing plate 111. For example, referring to FIG. 5, the ultrasonic vibration element 121 may be installed on a portion of the pressing surface of the pressing plate 111 according to a size and shape of a battery 10 pressed by the pressing plate 111 to optimize the installation of the ultrasonic vibration element 121.

Figure 6:
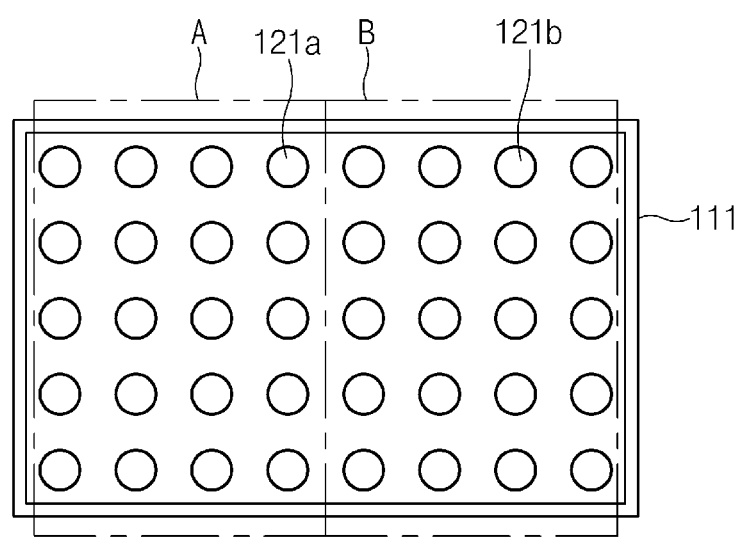

According to a second embodiment, in the ultrasonic vibration unit, an ultrasonic vibration element 121 may be regularly or irregularly installed on a pressing surface of a pressing plate 111. For example, as illustrated in FIG. 6, the ultrasonic vibration element 121 may be regularly installed to be spaced a predetermined distance from the pressing surface of the pressing plate to uniformly vibrate the entire surface of the battery cell, thereby realizing the uniform impregnation ability on the whole of the electrode assembly. Also, the ultrasonic vibration element 121 may be irregularly installed on the pressing surface of the pressing plate 111. Thus, a specific portion of the battery cell may be more strongly vibrated to improve the impregnation ability.

According to a third embodiment, as illustrated in FIG. 6, the ultrasonic vibration unit may be provided with a first vibration group A constituted by a plurality of ultrasonic vibration elements 121a, each of which has a first size, and a second vibration group B constituted by a plurality of ultrasonic vibration elements 121b, each of which has a second size equal to or different from the first size, on a pressing surface of a pressing plate 110. That is, a battery cell may be pressed by the first vibration group A to impregnate an electrolyte, or the battery cell may be pressed by the second vibration group B to impregnate the electrolyte according to a size and shape of the battery cell.

Figure 7:
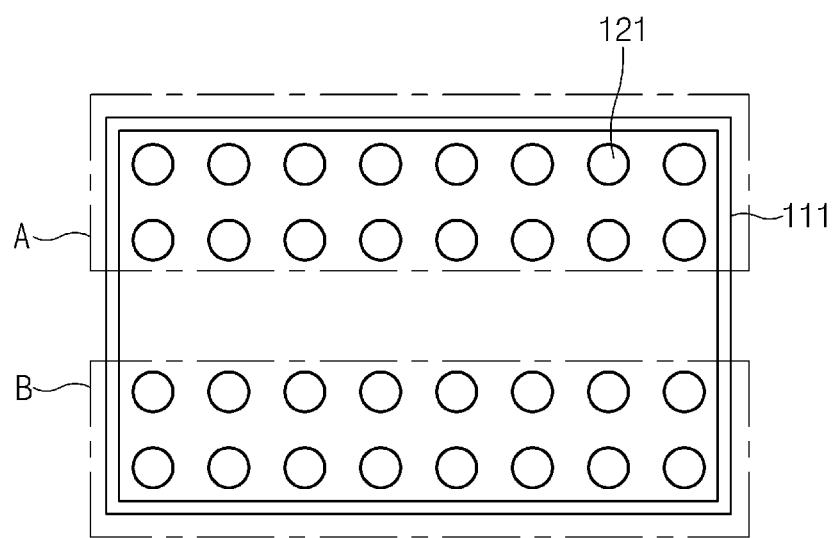
Figure 8:
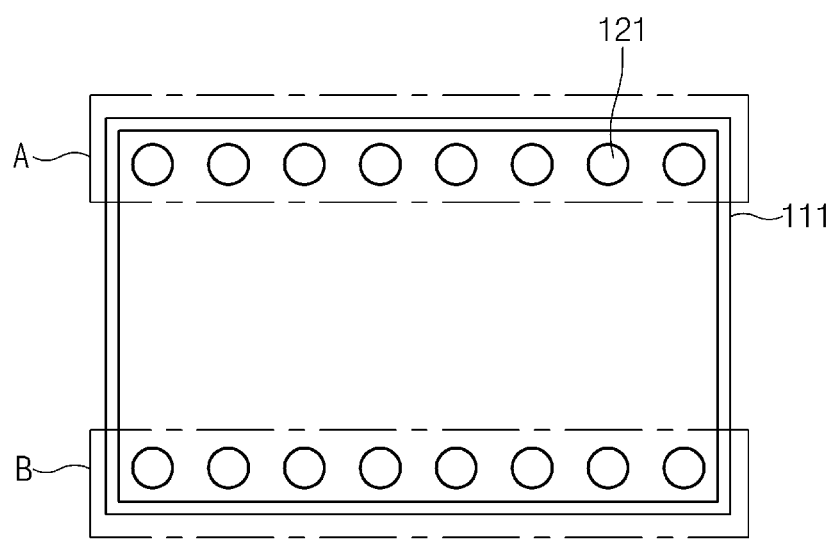

According to a fourth embodiment, in the ultrasonic vibration unit, a first vibration group A may be disposed on one side of a pressing surface of the pressing plate 111, and a second vibration group B may be disposed on the other side of the pressing surface of the pressing plate 111. For example, as illustrated in FIGS. 7 and 8, the first vibration group A may be disposed on an upper portion of the pressing plate 111, and the second vibration group B may be arranged on a lower portion of the pressing surface of the pressing plate 111. This is an arranged structure that is used when it is required for improving impregnation ability in upper and lower portions of the battery cell.

Alternatively, the first vibration group A may be arranged on a left portion of the pressing surface of the pressing plate 111, and the second vibration group B may be arranged on a right portion of the pressing surface of the pressing plate 111.

Figure 9:
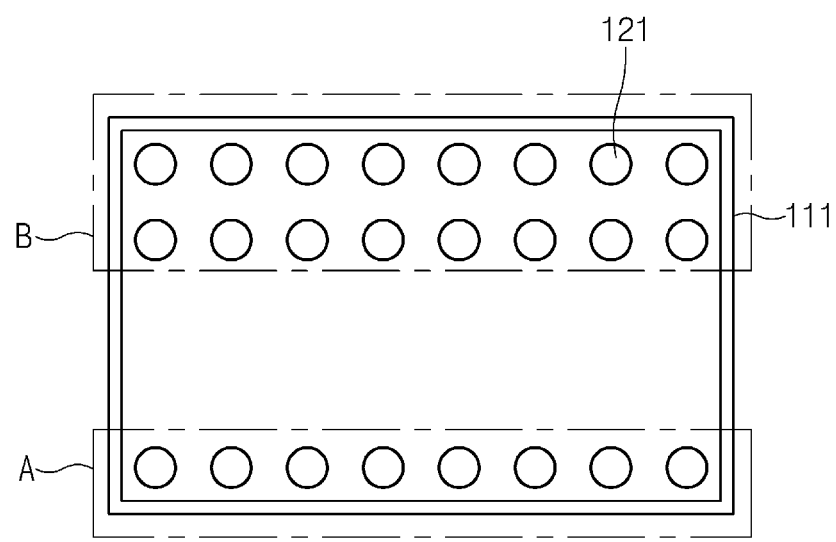
Figure 10:
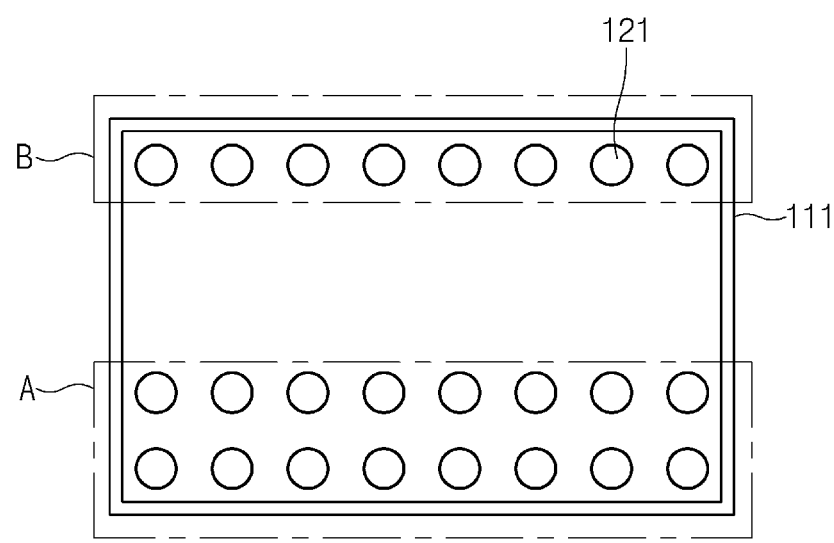

According to a fifth embodiment, the ultrasonic vibration unit may comprise ultrasonic vibration elements 121 in which the number of second vibration group B is greater than that of first vibration group A. For example, as illustrated in FIGS. 9 and 10, the second vibration group B and the first vibration group A are respectivley arranged on one side and the other side of a pressing surface of a pressing plate 111. Here, the ultrasonic vibration elements 121 of the second vibration group B may be arranged in two rows, and the ultrasonic vibration elements 121 of the first vibration group A may be arranged in one row as illustrated in FIG. 9. Alternatively, as illustrated in FIG. 10, the ultrasonic vibration elements of the second vibration group B may be arranged in one row, and the ultrasonic vibration elements of the first vibration group A may be arranged in two rows.

This structure may be used when it is necessary to apply different ultrasonic vibration areas on one side and the other side of the battery cell.

Figure 11:
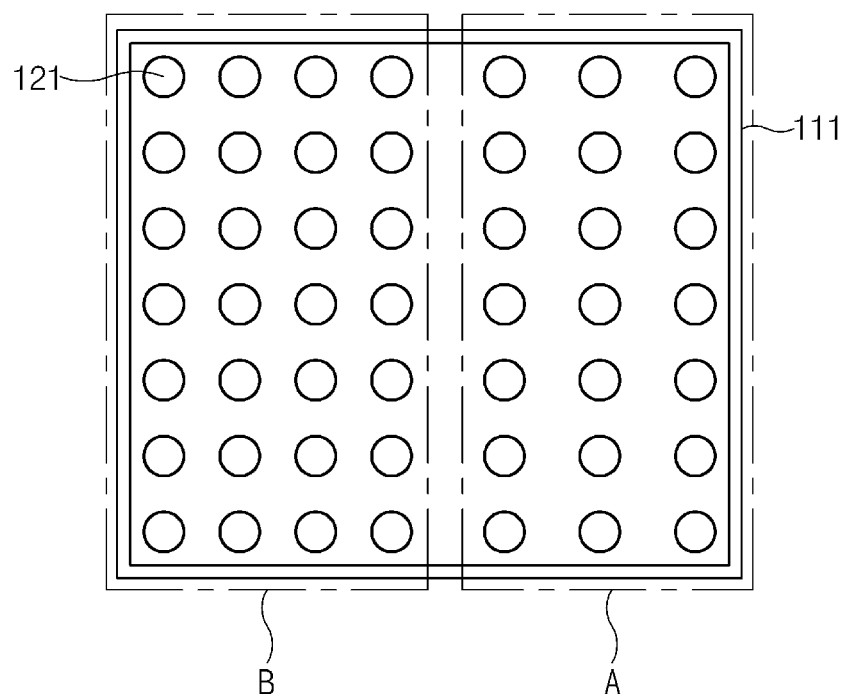

According to a sixth embodiment, in the ultrasonic vibration unit, ultrasonic vibration elements 121 of the second vibration group B are more densely arranged than those of the first vibration group A. For example, as illustrated in FIG. 11, the ultrasonic vibration elements 121b of the second vibration group B may be densely arranged so that more ultrasonic vibration elements 121b of the second vibration group B than the ultrasonic vibration elements 121a of the first vibration group A are installed.

According to a seventh embodiment, referring to FIGS. 5 to 11, in the ultrasonic vibration unit 7, a voltage may be applied to a plurality of ultrasonic vibration elements 121 provided in a first vibration group A through an ultrasonic generator to vibrate the plurality of ultrasonic vibration elements 121, or a voltage may be applied to a plurality of ultrasonic vibration elements 121 provided in a second vibration group B to vibrate the plurality of ultrasonic vibration elements 121. That is, only the ultrasonic vibration elements 121 of the group, by which the battery cell is pressed, may be vibrated to reduce unnecessary energy consumption.

According to an eighth embodiment, referring to FIGS. 5 to 11, in the ultrasonic vibration unit, a voltage may be applied to a portion of a plurality of ultrasonic vibration elements 121 provided in a first vibration group A through an ultrasonic generator to vibrate the portion of the plurality of ultrasonic vibration elements 121, or a voltage may be applied to a portion of a plurality of ultrasonic vibration elements 121 provided in a second vibration group B to vibrate the portion of the plurality of ultrasonic vibration elements 121. That is, only the ultrasonic vibration elements 121, by which a battery cell is pressed, may be vibrated regardless of the groups to reduce unnecessary energy consumption.

According to a ninth embodiment, referring to FIGS. 5 to 11, in the ultrasonic vibration unit, a voltage may be applied to a portion of a plurality of ultrasonic vibration elements 121 provided in a first vibration group A through an ultrasonic generator to vibrate the portion of the plurality of ultrasonic vibration elements 121, and simultaneously, a voltage may be applied to a portion of a plurality of ultrasonic vibration elements 121 provided in a second vibration group B to vibrate the portion of the plurality of ultrasonic vibration elements 121. That is, the ultrasonic vibration elements 121 of the groups A and B, by which the battery cells are actually pressed, may be ultrasonic-vibrated to reduce unnecessary energy consumption.

According to another embodiment of the present invention, the ultrasonic vibration element 121 may be provided as a spring having elastic restoring force. That is, the ultrasonic vibration element 121 may be provided as the spring having the elastic restoring force to adjust a pressure applied to the battery, and particularly, it may be unnecessary to add a separate part having the elastic restoring force.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An electrolyte impregnation apparatus comprising:
a pressing unit comprising a pressing plate that presses a battery cell in which an electrode assembly and an electrolyte are accommodated; and
an ultrasonic vibration unit installed to a portion or the whole of the pressing plate to apply ultrasonic vibration to the battery cell,
wherein the ultrasonic vibration unit comprises:
an ultrasonic vibration element applying the ultrasonic vibration to the battery cell;
a fixing member for fixing the ultrasonic vibration element to the pressing surface of the pressing plate; and
a protection cover having flexibility disposed on an outer circumferential surface of the fixing member.

2. The electrolyte impregnation apparatus of claim 1, wherein the ultrasonic vibration unit further comprises an ultrasonic generator applying a voltage to the ultrasonic vibration element to vibrate the ultrasonic vibration element.

3. The electrolyte impregnation apparatus of claim 1, wherein the ultrasonic vibration element is disposed on a pressing surface of the pressing plate that presses the battery cell.

4. The electrolyte impregnation apparatus of claim 3, wherein a plurality of ultrasonic vibration elements are regularly or irregularly arranged on the pressing surface of the pressing plate.

5. The electrolyte impregnation apparatus of claim 4, wherein the ultrasonic generator applies the voltage to one or two or more ultrasonic vibration elements of the plurality of ultrasonic vibration elements disposed on the pressing plate to vibrate the ultrasonic vibration elements to which the voltage is applied.

6. The electrolyte impregnation apparatus of claim 3, wherein a first vibration group constituted by a plurality of ultrasonic vibration elements, each of which has a first size, and a second ultrasonic vibration group constituted by a plurality of ultrasonic vibration elements, each of which has a second size equal to or different from the first size, are disposed on the pressing surface of the pressing plate.

7. The electrolyte impregnation apparatus of claim 6, wherein the first vibration group is disposed on one side of the pressing surface of the pressing plate, and the second vibration group is disposed on the other side of the pressing surface of the pressing plate.

8. The electrolyte impregnation apparatus of claim 6, wherein the number of ultrasonic vibration elements provided in the second vibration group is greater than that of ultrasonic vibration elements provided in the first vibration group.

9. The electrolyte impregnation apparatus of claim 6, wherein the ultrasonic vibration elements of the second vibration group are more densely arranged than those of the first vibration group.

10. The electrolyte impregnation apparatus of claim 6, wherein the ultrasonic generator applies a voltage to the plurality of ultrasonic vibration elements provided in the first vibration group to vibrate the plurality of ultrasonic vibration elements or applies a voltage to the plurality of ultrasonic vibration elements provided in the second vibration group to vibrate the plurality of ultrasonic vibration elements.

11. The electrolyte impregnation apparatus of claim 6, wherein the ultrasonic generator applies a voltage to only a portion of the plurality of ultrasonic vibration elements provided in the first vibration group.

12. The electrolyte impregnation apparatus of claim 6, wherein the ultrasonic generator applies a voltage to only a portion of the plurality of ultrasonic vibration elements provided in the second vibration group.

13. The electrolyte impregnation apparatus of claim 6, wherein the ultrasonic generator applies a voltage to only a portion of the plurality of ultrasonic vibration elements provided in the first vibration group and simultaneously applies a voltage to only a portion of the plurality of ultrasonic vibration elements provided in the second vibration group.

14. The electrolyte impregnation apparatus of claim 1, wherein the fixing member is provided as a spring.

15. The electrolyte impregnation apparatus of claim 1, wherein the ultrasonic vibration element is provided as a spring having elastic restoring force.

* * * * *